United States Patent
Can et al.

(10) Patent No.: US 12,020,268 B1
(45) Date of Patent: Jun. 25, 2024

(54) TARGETED SURVEYS TO A SUBSET OF CLIENT DEVICES BASED ON GEOLOCATION, USER APPLICATION ACTIVITIES, AND DISPLAY DURATION

(71) Applicant: Snap Inc., Santa Monica, CA (US)

(72) Inventors: Tolga Can, Marina Del Rey, CA (US); Yu Chen, Santa Clara, CA (US); Yiwei Ma, Los Angeles, CA (US); Joshua Siegel, Venice, CA (US); Shuo Wu, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 795 days.

(21) Appl. No.: 15/638,795

(22) Filed: Jun. 30, 2017

(51) Int. Cl.
G06Q 30/0203 (2023.01)
G06Q 30/0201 (2023.01)
G06Q 30/0204 (2023.01)
H04L 41/06 (2022.01)

(52) U.S. Cl.
CPC ..... G06Q 30/0203 (2013.01); G06Q 30/0201 (2013.01); G06Q 30/0205 (2013.01); *H04L 41/06* (2013.01)

(58) Field of Classification Search
CPC ............... G06Q 30/02; G06Q 30/0277; G06Q 30/0241; G06Q 30/0267; G06Q 30/0251; G06Q 30/0269; G06Q 30/0255; G06Q 30/0276; G06Q 30/0242; G06Q 30/0261; G06Q 30/0271; G06Q 30/0205; G06Q 30/0245
See application file for complete search history.

(56) References Cited

U.S. PATENT DOCUMENTS

| | | | | |
|---|---|---|---|---|
| 5,796,952 A | * | 8/1998 | Davis | H04L 67/306 709/224 |
| 5,893,075 A | * | 4/1999 | Plainfield | G06Q 20/20 235/376 |
| 5,893,098 A | * | 4/1999 | Peters | G06Q 30/02 |
| 5,948,061 A | * | 9/1999 | Merriman | G06Q 30/0264 709/219 |
| 6,070,145 A | * | 5/2000 | Pinsley | G06Q 30/02 705/14.19 |
| 6,385,620 B1 | * | 5/2002 | Kurzius | G06Q 10/10 |

(Continued)

OTHER PUBLICATIONS

Qualtrics Survey Software—Handbook for Research Professionals Qualtrics Labs, Inc., 2012 (Year: 2012).*

(Continued)

*Primary Examiner* — Scott L Jarrett
(74) *Attorney, Agent, or Firm* — Schwegman Lundberg & Woessner, P.A.

(57) ABSTRACT

A survey distribution system receives a selection of a first subset of a user population. For example, an administrator of the system may select one or more user attributes of the users among the user population. In response, the survey distribution system identified the first subset of users based on the selected attributes. In some example embodiments, the administrator of the system may additionally define a maximum or minimum number of users to be exposed to the content, as well as targeting parameters for the content, such as a period of time in which to distribute the content to the first subset of users, as well as location criteria, such that the content may only be distributed to users located in specific areas.

17 Claims, 11 Drawing Sheets

(56) References Cited

U.S. PATENT DOCUMENTS

| | | | | |
|---|---|---|---|---|
| 6,477,504 B1* | 11/2002 | Hamlin | G06Q 10/06 | 705/7.32 |
| 6,647,257 B2* | 11/2003 | Owensby | H04M 3/42348 | 455/414.1 |
| 6,771,290 B1* | 8/2004 | Hoyle | G06F 9/00 | 717/170 |
| 6,901,424 B1* | 5/2005 | Winn | H04L 67/22 | 709/201 |
| 8,046,797 B2* | 10/2011 | Bentolila | H04N 21/4663 | 725/46 |
| 8,234,193 B2* | 7/2012 | Ransom | H04W 4/21 | 705/35 |
| 8,433,299 B2* | 4/2013 | Rao | H04L 67/34 | 455/414.1 |
| 9,147,201 B2* | 9/2015 | Crawford | G06Q 30/0259 | |
| 9,299,078 B2* | 3/2016 | Gierkink | G06Q 20/102 | |
| 9,495,693 B2* | 11/2016 | Box | G06Q 30/0251 | |
| 9,741,047 B1* | 8/2017 | Wood | G06Q 10/067 | |
| 9,747,384 B1* | 8/2017 | Rao | G06F 16/95 | |
| 9,754,313 B2* | 9/2017 | Rao | G06Q 30/02 | |
| 10,026,102 B2* | 7/2018 | Mihalik | H04L 67/306 | |
| 10,055,748 B2* | 8/2018 | Nowak | G06Q 30/0203 | |
| 10,089,636 B2* | 10/2018 | Teo | G06Q 30/02 | |
| 10,146,758 B1* | 12/2018 | Dorner | G06F 21/00 | |
| 10,164,918 B2* | 12/2018 | Baker | H04W 4/18 | |
| 10,289,738 B1* | 5/2019 | Ross | G06Q 30/0204 | |
| 10,311,085 B2* | 6/2019 | Rezaei | G06F 16/285 | |
| 10,354,278 B2* | 7/2019 | Silvestro | G06Q 30/0261 | |
| 10,467,303 B1* | 11/2019 | Ross | G06Q 50/01 | |
| 10,474,963 B1* | 11/2019 | Park | G06N 20/00 | |
| 10,607,169 B1* | 3/2020 | Carlisle | G06Q 10/06312 | |
| 10,643,222 B2* | 5/2020 | Cristofaro | H04W 12/02 | |
| 10,664,854 B2* | 5/2020 | Wood | G06Q 10/067 | |
| 11,132,701 B2* | 9/2021 | Tremblay | G06Q 30/0203 | |
| 2001/0053514 A1* | 12/2001 | Doi | H04H 60/21 | 434/350 |
| 2002/0002482 A1* | 1/2002 | Thomas | G06Q 30/0203 | 705/7.32 |
| 2002/0016731 A1* | 2/2002 | Kupersmit | G06Q 30/02 | 705/7.32 |
| 2002/0128898 A1* | 9/2002 | Smith, Jr. | G06Q 30/0203 | 705/7.32 |
| 2002/0138284 A1* | 9/2002 | DeCotiis | G06Q 30/0203 | 705/7.32 |
| 2003/0163514 A1* | 8/2003 | Waldschmidt | H04L 67/22 | 709/201 |
| 2003/0177488 A1 | 9/2003 | Smith et al. | | |
| 2004/0128215 A1* | 7/2004 | Florance | G06Q 10/087 | 705/28 |
| 2005/0075919 A1* | 4/2005 | Kim | G06Q 30/02 | 705/7.26 |
| 2006/0004621 A1* | 1/2006 | Malek | G06Q 30/02 | 705/7.32 |
| 2007/0174258 A1* | 7/2007 | Jones | G06Q 30/02 | |
| 2008/0091510 A1* | 4/2008 | Crandall | G06Q 30/0204 | 705/7.32 |
| 2008/0119134 A1* | 5/2008 | Rao | G06Q 30/02 | 455/3.05 |
| 2008/0133347 A1* | 6/2008 | Josifovski | G06Q 30/0245 | 705/14.44 |
| 2009/0018893 A1* | 1/2009 | Aviv | G06Q 30/02 | 705/7.32 |
| 2009/0018913 A1* | 1/2009 | Sarukkai | G06Q 30/0267 | 705/14.56 |
| 2009/0187470 A1* | 7/2009 | Smadja | G06Q 30/0203 | 705/14.44 |
| 2009/0248507 A1* | 10/2009 | Hamaoui | G06Q 30/02 | 705/14.58 |
| 2009/0307003 A1* | 12/2009 | Benyamin | G06Q 50/01 | 705/319 |
| 2010/0198367 A1* | 8/2010 | Petricoin, Jr. | G01S 5/0018 | 700/17 |
| 2010/0257023 A1* | 10/2010 | Kendall | G06Q 30/0254 | 705/14.1 |
| 2010/0274566 A1* | 10/2010 | Carlson | G06Q 30/0255 | 705/14.71 |
| 2010/0332305 A1* | 12/2010 | Higgins | H04W 4/23 | 705/14.16 |
| 2011/0161419 A1* | 6/2011 | Chunilal | H04L 51/14 | 709/204 |
| 2011/0231226 A1* | 9/2011 | Golden | G06Q 40/12 | 705/7.32 |
| 2011/0288917 A1* | 11/2011 | Wanek | H04W 4/21 | 705/14.5 |
| 2012/0019365 A1* | 1/2012 | Tuikka | H04L 67/306 | 709/204 |
| 2012/0089455 A1* | 4/2012 | Belani | G06Q 30/0245 | 705/14.44 |
| 2012/0173305 A1* | 7/2012 | Bhaskaran | G06Q 30/0203 | 705/7.32 |
| 2012/0226743 A1* | 9/2012 | Smargon | G06Q 20/06 | 709/203 |
| 2012/0266189 A1* | 10/2012 | Zaslavsky | G06Q 30/02 | 725/32 |
| 2012/0330722 A1 | 12/2012 | Volpe et al. | | |
| 2013/0004933 A1* | 1/2013 | Bhaskaran | G09B 7/00 | 434/362 |
| 2013/0046613 A1* | 2/2013 | Farahat | G06Q 30/00 | 705/14.43 |
| 2013/0073377 A1* | 3/2013 | Heath | G06Q 30/02 | 705/14.39 |
| 2013/0080526 A1* | 3/2013 | Gill | G06Q 10/10 | 709/204 |
| 2013/0226664 A1* | 8/2013 | Rinzler | G06Q 30/0203 | 705/7.32 |
| 2013/0230841 A1* | 9/2013 | Bremer | G06Q 30/0203 | 434/322 |
| 2013/0268373 A1* | 10/2013 | Grishaver | G06Q 30/02 | 705/14.67 |
| 2013/0275278 A1* | 10/2013 | Bankston | G06Q 10/06 | 705/29 |
| 2013/0298084 A1* | 11/2013 | Spivack | H04L 67/1076 | 705/14.67 |
| 2014/0040008 A1* | 2/2014 | Belani | G06Q 30/02 | 705/14.41 |
| 2014/0081880 A1* | 3/2014 | Estes, Jr. | G06Q 30/0241 | 705/319 |
| 2014/0089049 A1* | 3/2014 | Cristofaro | G06Q 30/0201 | 705/7.32 |
| 2014/0095296 A1* | 4/2014 | Angell | G06Q 30/0246 | 705/14.45 |
| 2014/0108537 A1* | 4/2014 | Crawford | H04L 67/54 | 709/204 |
| 2014/0180822 A1* | 6/2014 | Peebles | G06Q 30/0267 | 705/14.64 |
| 2014/0214533 A1* | 7/2014 | Box | G06Q 30/0251 | 705/14.49 |
| 2014/0221095 A1* | 8/2014 | MacNaughton | A63F 13/215 | 463/35 |
| 2014/0272902 A1* | 9/2014 | Bleile | G06Q 30/0203 | 434/362 |
| 2014/0278691 A1* | 9/2014 | Schenken | G06Q 10/08345 | 705/7.22 |
| 2014/0310076 A1* | 10/2014 | Liberty | G06Q 30/0269 | 705/14.1 |
| 2014/0337102 A1* | 11/2014 | Skoler | G07F 17/329 | 705/7.32 |
| 2014/0364103 A1* | 12/2014 | Marti | H04W 4/029 | 455/418 |
| 2015/0073893 A1* | 3/2015 | Brown | G06Q 30/0246 | 705/14.45 |
| 2015/0120455 A1* | 4/2015 | McDevitt | G06Q 30/0261 | 705/14.58 |
| 2015/0141045 A1* | 5/2015 | Qiu | H04W 4/021 | 455/456.1 |
| 2015/0163561 A1* | 6/2015 | Grevers, Jr. | H04N 21/42203 | 704/235 |

(56) References Cited

U.S. PATENT DOCUMENTS

| | | | | |
|---|---|---|---|---|
| 2015/0186537 | A1* | 7/2015 | Liu | G06Q 10/063112 |
| | | | | 707/722 |
| 2015/0193793 | A1* | 7/2015 | Hall | G06Q 30/0203 |
| | | | | 705/7.32 |
| 2015/0213467 | A1* | 7/2015 | Sanghavi | G06Q 30/0203 |
| | | | | 705/7.32 |
| 2015/0237472 | A1* | 8/2015 | Alsina | H04W 4/025 |
| | | | | 455/456.3 |
| 2015/0317676 | A1* | 11/2015 | Reid | G06Q 30/0255 |
| | | | | 705/14.53 |
| 2015/0324811 | A1* | 11/2015 | Courtright | H04W 4/06 |
| | | | | 705/7.32 |
| 2015/0324825 | A1* | 11/2015 | McLean | G06Q 30/0204 |
| | | | | 705/7.31 |
| 2015/0350827 | A1* | 12/2015 | Birch | H04W 4/021 |
| | | | | 455/456.1 |
| 2015/0356570 | A1* | 12/2015 | Goldsmid | G06Q 30/0269 |
| | | | | 705/7.29 |
| 2016/0086228 | A1* | 3/2016 | Babb | H04W 4/029 |
| | | | | 705/14.64 |
| 2016/0180398 | A1* | 6/2016 | Lu | G06Q 30/0269 |
| | | | | 705/14.66 |
| 2016/0253764 | A1* | 9/2016 | Sinno | G06Q 50/01 |
| | | | | 705/319 |
| 2016/0267543 | A1* | 9/2016 | Manimaran | G06Q 30/0269 |
| 2017/0068987 | A1* | 3/2017 | Levinson | G06Q 30/0246 |
| 2017/0123643 | A1* | 5/2017 | Berns | G06F 16/9535 |
| 2017/0221082 | A1* | 8/2017 | Murray | G06Q 30/0203 |
| 2017/0221095 | A1* | 8/2017 | Gauglitz | G06Q 50/01 |
| 2017/0222962 | A1* | 8/2017 | Gauglitz | H04L 51/222 |
| 2017/0278142 | A1* | 9/2017 | Riordan | H04L 67/18 |
| 2018/0018686 | A1* | 1/2018 | Wood | G06Q 30/0204 |
| 2018/0096369 | A1* | 4/2018 | Kayton | G06Q 30/0203 |
| 2018/0174167 | A1* | 6/2018 | Tremblay | G06N 20/00 |
| 2018/0308113 | A1* | 10/2018 | Kopikare | G06Q 10/1095 |
| 2018/0336573 | A1* | 11/2018 | Luff | G06Q 30/0203 |
| 2019/0156370 | A1* | 5/2019 | Harrison | G06Q 30/0267 |
| 2021/0082063 | A1* | 3/2021 | Miller | G06F 16/29 |

OTHER PUBLICATIONS

Schonlau, Matthias et al., Selection Bias in Web Surveys and the User of Propensity Scores RAND, Apr. 2006 (Year: 2006).*
Gu, Jinwei, A Real-time and Location-based Advertising Model University of Doblin, Dissertation, 2015 (Year: 2015).*
Bengre, Nehal et al., Location Based Mobile Advertising using GPS International Journal of Engineering Research & Technology, vol. 4, No. 9, Sep. 2015 (Year: 2015).*
Luo, Xueming et al., Mobile Targeting Management Science, vol. 60 No. 7, Jul. 2014 (Year: 2014).*
Google AdWords Reference Guide Google, 2014 (Year: 2014).*

U.S. Appl. No. 15/839,200, filed Dec. 12, 2017, Survey Distribution System.
"U.S. Appl. No. 15/839,200, Final Office Action dated Feb. 17, 2021", 22 pgs.
"U.S. Appl. No. 15/839,200, Non Final Office Action dated Oct. 21, 2020", 16 pgs.
"U.S. Appl. No. 15/839,200, Response filed Jan. 19, 2021 to Non Final Office Action dated Oct. 21, 2020", 13 pgs.
"U.S. Appl. No. 15/839,200, Response filed Apr. 13, 2021 to Final Office Action dated Feb. 17, 2021", 13 pgs.
"U.S. Appl. No. 15/839,200, Final Office Action dated Oct. 21, 2021", 24 pgs.
"U.S. Appl. No. 15/839,200, Non Final Office Action dated Jul. 19, 2021", 21 pgs.
"U.S. Appl. No. 15/839,200, Response filed Aug. 10, 2021 to Non Final Office Action dated Jul. 19, 2021", 14 pages.
"U.S. Appl. No. 15/839,200, Non Final Office Action dated Feb. 22, 2022", 22 pgs.
"U.S. Appl. No. 15/839,200, Response filed Jan. 20, 2022 to Final Office Action dated Oct. 21, 2021", 14 pgs.
"U.S. Appl. No. 15/839,200, Response filed May 18, 2022 to Non Final Office Action dated Feb. 22, 2022", 13 pgs.
"U.S. Appl. No. 15/839,200, Final Office Action dated Jun. 28, 2022", 23 pgs.
"U.S. Appl. No. 15/839,200, Response filed Jul. 29, 2022 to Final Office Action dated Jun. 28, 2022".
"U.S. Appl. No. 15/839,200, Non Final Office Action dated Aug. 22, 2022", 22 pgs.
"U.S. Appl. No. 15/839,200, Final Office Action dated Oct. 27, 2022", 26 pgs.
"U.S. Appl. No. 15/839,200, Response filed Oct. 4, 2022 to Non Final Office Action dated Aug. 22, 2022", 13 pgs.
"U.S. Appl. No. 15/839,200, Non Final Office Action dated Jan. 19, 2023".
"U.S. Appl. No. 15/839,200, Response filed Dec. 27, 2022 to Final Office Action dated Oct. 27, 2022", 14 pgs.
"U.S. Appl. No. 15/839,200, Final Office Action dated May 8, 2023".
"U.S. Appl. No. 15/839,200, Response filed Apr. 19, 2023 to Non Final Office Action dated Jan. 19, 2023", 14 pgs.
"U.S. Appl. No. 15/839,200, Response filed Jul. 6, 2023 to Final Office Action dated May 8, 2023", 13 pgs.
"U.S. Appl. No. 15/839,200, Non Final Office Action dated Jul. 28, 2023", 20 pgs.
"U.S. Appl. No. 15/839,200, Final Office Action dated Nov. 9, 2023", 23 pgs.
"U.S. Appl. No. 15/839,200, Response filed Oct. 23, 2023 to Non Final Office Action dated Jul. 28, 2023", 12 pgs.
"U.S. Appl. No. 15/839,200, Response filed Mar. 11, 2024 to Final Office Action mailed Nov. 9, 2023", 13 pgs.
"U.S. Appl. No. 15/839,200, Non Final Office Action mailed May 2, 2024", 24 pgs.

* cited by examiner

TARGETED SURVEYS TO A SUBSET OF CLIENT DEVICES BASED ON GEOLOCATION, USER APPLICATION ACTIVITIES, AND DISPLAY DURATION

TECHNICAL FIELD

Embodiments of the present disclosure relate generally to systems for the distribution and presentation of surveys to calculate a lift associated with data objects.

BACKGROUND

Conventionally, surveys are carried out by phone or mail, upon populations of users selected based on demographics information. As a result, survey populations are often excessively broad, and as a result may fail to accurately illustrate preferences, opinions, behavior, or factual information of the intended survey population. Furthermore, the actual method of collecting survey responses may be inaccurate, due to the addition of the variables of the time of day in which a survey call is placed, and who is conducting the survey itself. For example, individuals among a survey population may be more amendable to responding to survey questions earlier in the day—as a result, some survey recipients may altogether ignore or disregard the survey. In this way, only a small portion of a population may actually even respond to surveys, thus disrupting the accuracy of the survey.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
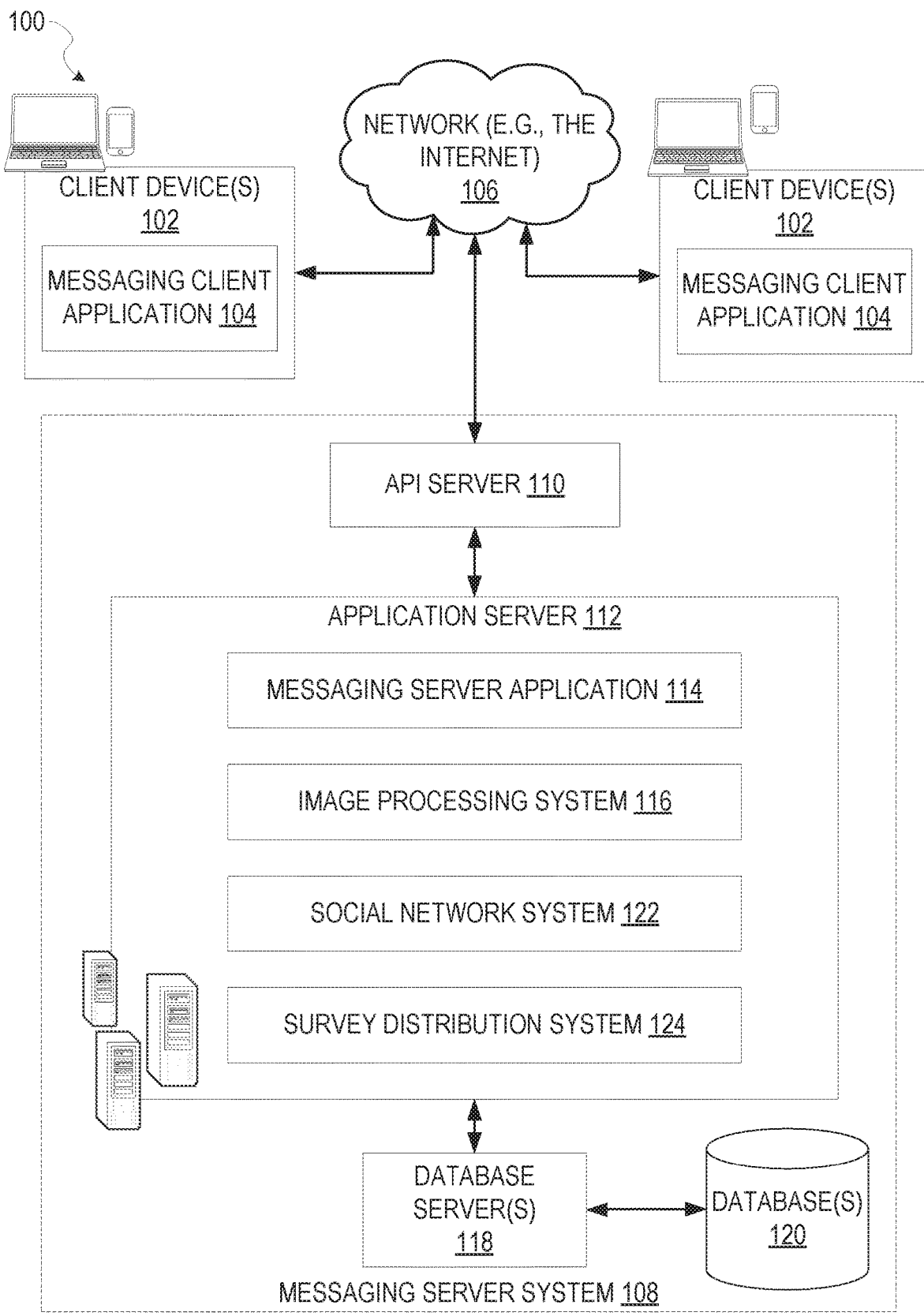
FIG. 1 is a block diagram showing an example messaging system for exchanging data (e.g., messages and associated content) over a network in accordance with some embodiments, wherein the messaging system includes a survey distribution system.

Embodiments of the present disclosure relate generally to systems for the distribution and presentation of surveys to calculate a lift associated with data objects. In various embodiments described herein, a survey distribution system receives a selection of a first subset of a user population. For example, an administrator of the system may select one or more user attributes of the users among the user population. In response, the survey distribution system identified the first subset of users based on the selected attributes. In some example embodiments, the administrator of the system may additionally define a maximum or minimum number of users to be exposed to the content, as well as targeting parameters for the content, such as a period of time in which to distribute the content to the first subset of users, as well as location criteria, such that the content may only be distributed to users located in specific areas.

The survey distribution system distributes content to the first subset of the user population. The content may include data objects including media items, such as images, videos, filter elements, audio, and the like. In some example embodiments, the distribution of the content to the first subset of the user population includes causing display of a notification at client devices associated with the first subset of the user population, wherein the notification is configured to receive a user input to either allow, or disallow display of the content. The survey distribution system detects exposure of users among the subset of the user population to the content, based on the users causing display of the content, and calculates a number of exposed users.

For example, in response to detecting an exposure of a user to the content, the survey distribution system calculates a propensity score of the exposed user. The propensity score is a metric to summarize a user's likelihood to be exposed to the content. A high propensity score may therefore indicate that a user that receives the content is likely to cause display of the content, while a low propensity score may indicate that a user that receives the content would ignore or disallow the content from being displayed. The survey distribution system may calculate an average propensity score of the first subset of users. In some example embodiments, the survey distribution system distributes the content to users until a threshold number of users are exposed to the content. For example, to expose 10 users to the content, the survey distribution system may in affect actually have to deliver the content to 15 users, such that out of the 15 users, only 10 users actually respond to a notification to display the content.

Having detected exposure of a requisite number of users, the survey distribution system identifies a second subset of users among the user population, wherein the second subset of users include users that were not exposed to the content.

In some example embodiments, the survey distribution system may identify users based on the average propensity score of the users of the first subset. In further embodiments, the survey distribution system may identify an equal numbers of users as those in the first subset of the user population.

The survey distribution system distributes new content related to the content to the first subset of users and the second subset of users. The new content may for example include a survey, wherein the survey includes queries related to the content exposed to the first subset of users. In some example embodiments, the queries of the survey may include requests for a binary response (e.g., yes or no, good or bad, etc.).

The survey distribution system may cause display of a notification that includes a request to display the survey. In response to receiving an acceptance of the request, the survey distribution system causes display of the survey.

In some example embodiments, in order to ensure that the same number of users from among the first subset (e.g., the exposed users) and the second subset (e.g., the control group) respond to the survey, the survey distribution system may track numbers of users that accept the request to cause display of the survey. For example, if too few users among one of the subsets accept the request to display the survey, the survey distribution system may identify additional users based on the propensity scores, and whether the user has been previously exposed to the content or not, and distribute the survey to the newly identified users.

The survey distribution system collects the responses to the survey from both the first subset of users and the second subset of users, and calculates a lift associated with the content. For example, the responses may indicate that users exposed to the content respond favorably to the survey, while users not exposed to the content respond unfavorably. Similarly, the responses to the survey may indicate that users exposed to the content favor a certain item or brand, while users not exposed to the content do not. In some example embodiments, the survey distribution system may generate visualizations based on the responses to the survey, and user attributes of the users of the first and second subsets. The visualization may include charts (e.g., pie charts, Venn-diagrams), as well as graphs.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a survey distribution system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
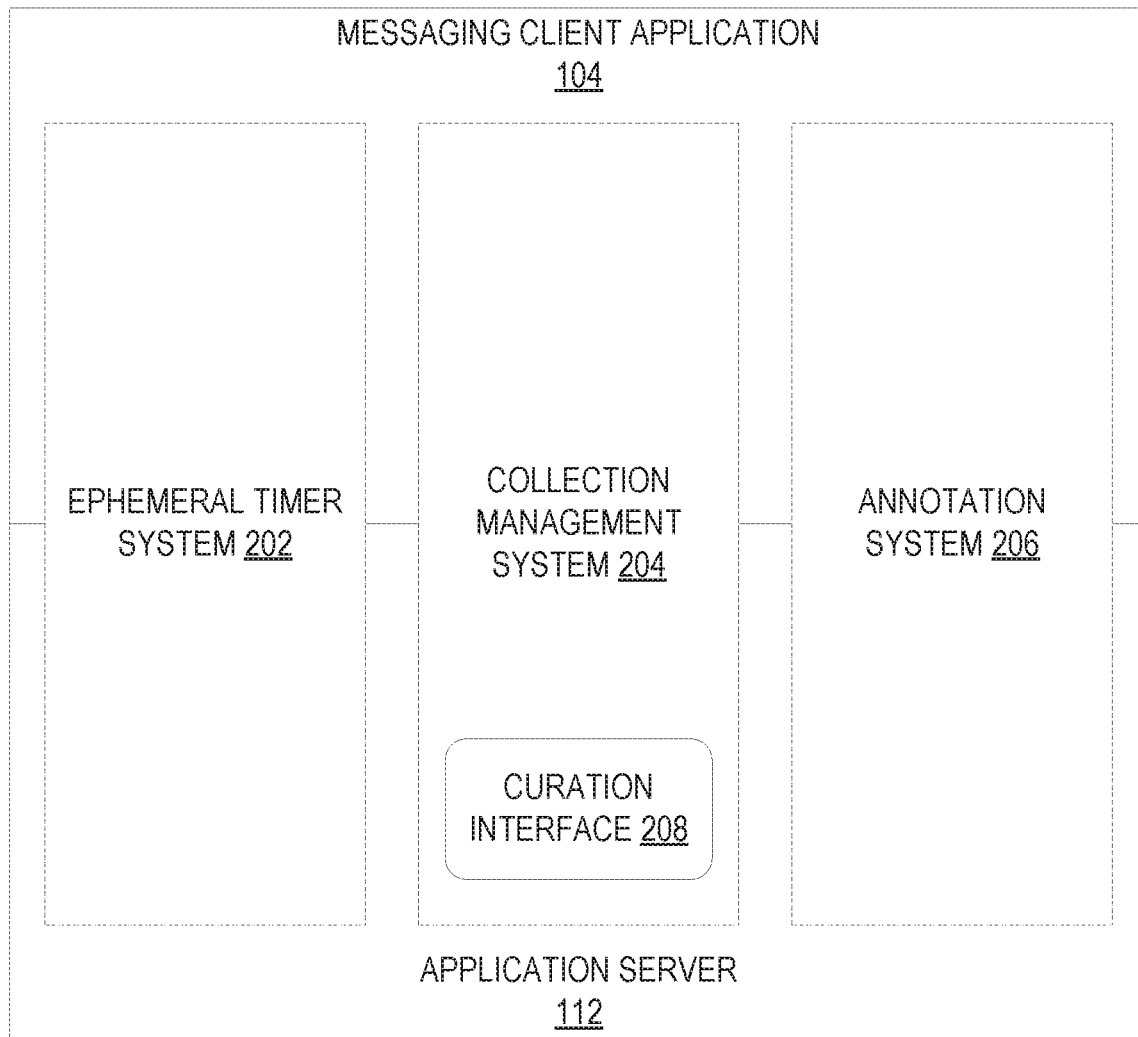
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of content to be distributed to client devices (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
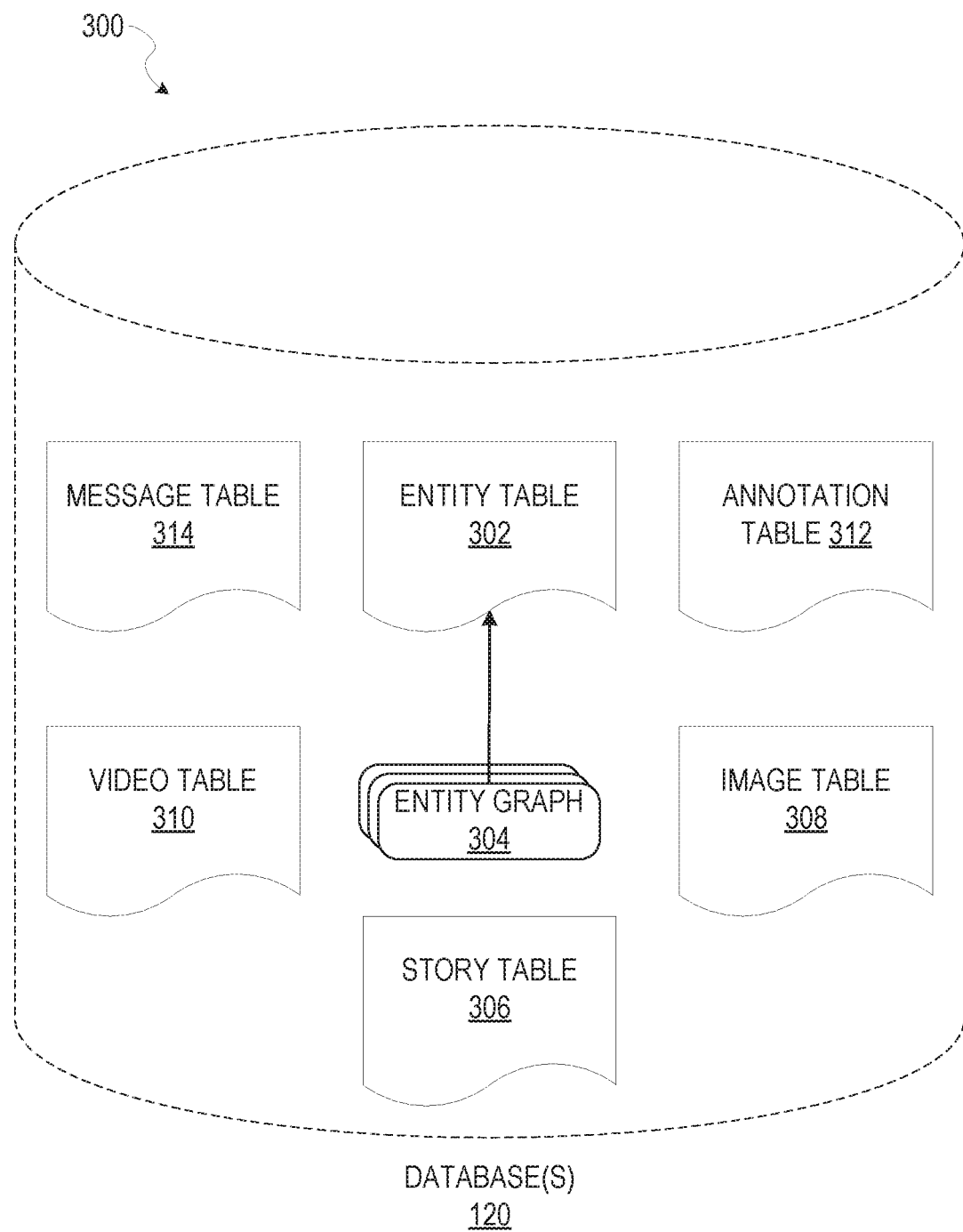
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story." which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
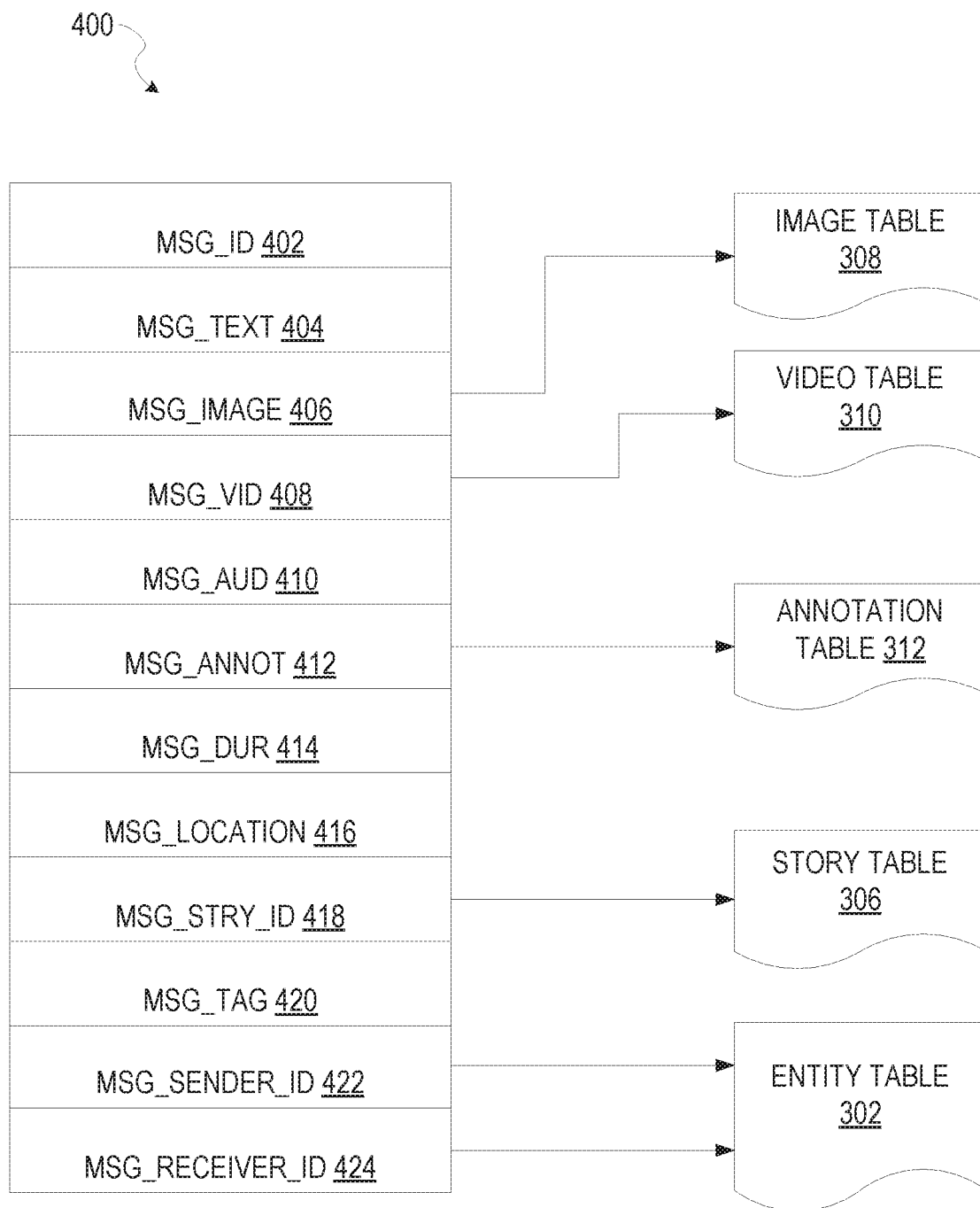
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
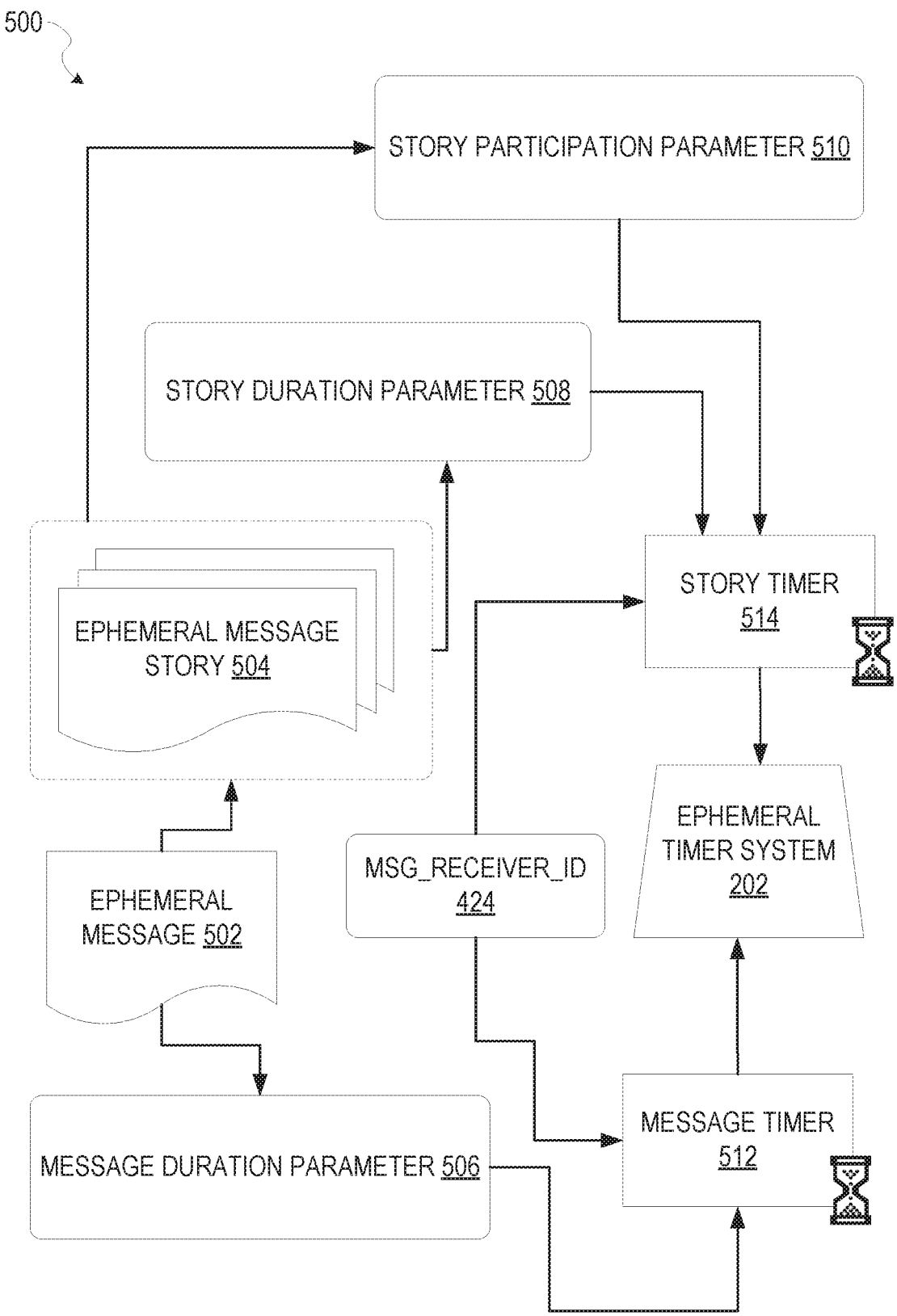
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral tinier system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
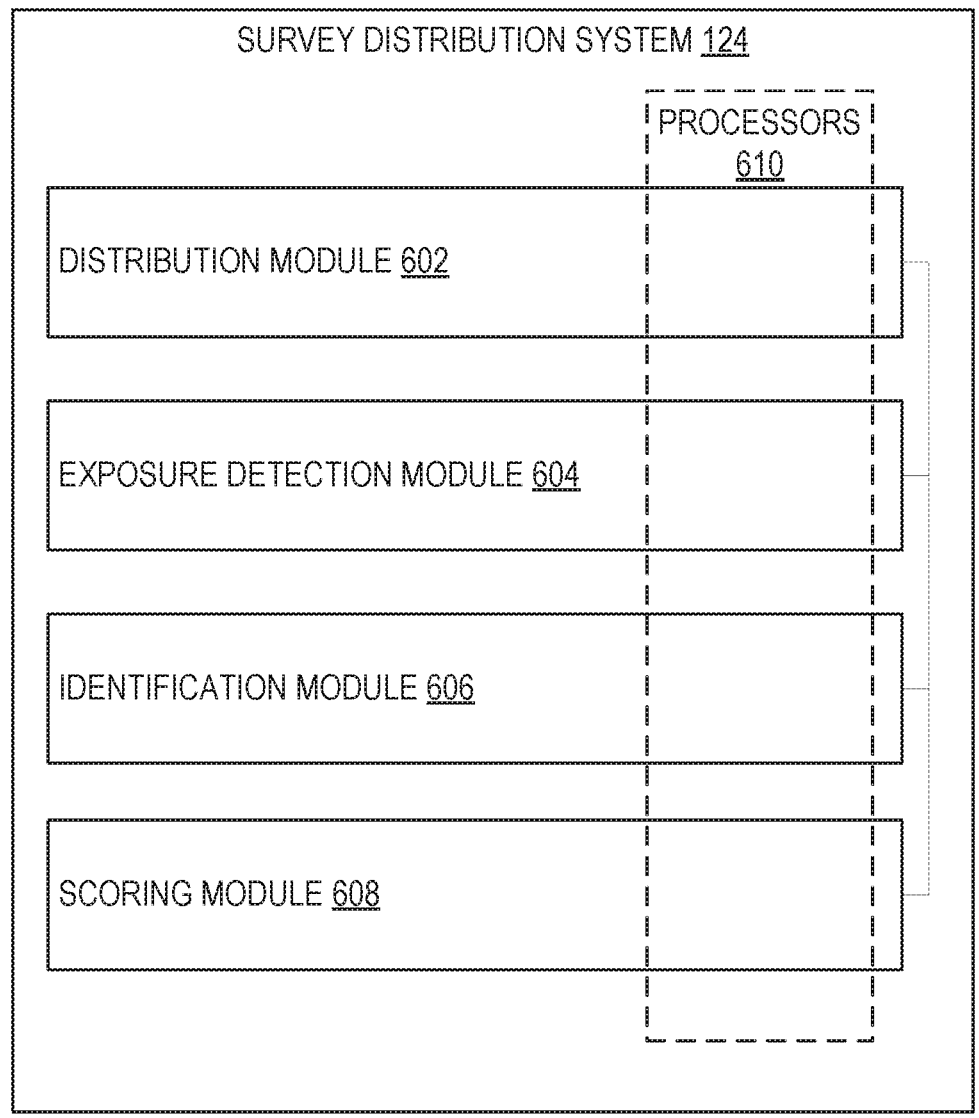
FIG. 6 is a block diagram illustrating various modules of a survey distribution system, according to certain example embodiments.

FIG. 6 is a block diagram illustrating components of the survey distribution system 124, that configure the survey distribution system 124 to distribute content to a subset of users among a population of users, detect exposure of client devices among the subset of users to content (e.g., an ad campaign), calculate an average propensity score of the subset of users, identify a second subset of users among the population of users, wherein the second subset of users have not been exposed to the content and have a similar propensity score, distribute a survey to the first and second subsets, and calculate a lift associated with the content based on responses to the survey, according to some example embodiments. The survey distribution system 124 is shown as including a distribution module modules 602, an exposure detection module 604, an identification module 606, and a scoring module 608, all configured to communicate with each other (e.g., via a bus, shared memory, or a switch). Any one or more of these modules may be implemented using one or more processors 610 (e.g., by configuring such one or more processors to perform functions described for that module) and hence may include one or more of the processors 610.

Any one or more of the modules described may be implemented using hardware alone (e.g., one or more of the processors 610 of a machine) or a combination of hardware and software. For example, any module described of the survey distribution system 124 may physically include an arrangement of one or more of the processors 610 (e.g., a subset of or among the one or more processors of the machine) configured to perform the operations described herein for that module. As another example, any module of the engagement tracking system 610 may include software, hardware, or both, that configure an arrangement of one or more processors 610 (e.g., among the one or more processors of the machine) to perform the operations described herein for that module. Accordingly, different modules of the engagement tracking system 610 may include and configure different arrangements of such processors 610 or a single arrangement of such processors 610 at different points in time. Moreover, any two or more modules of the survey distribution system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
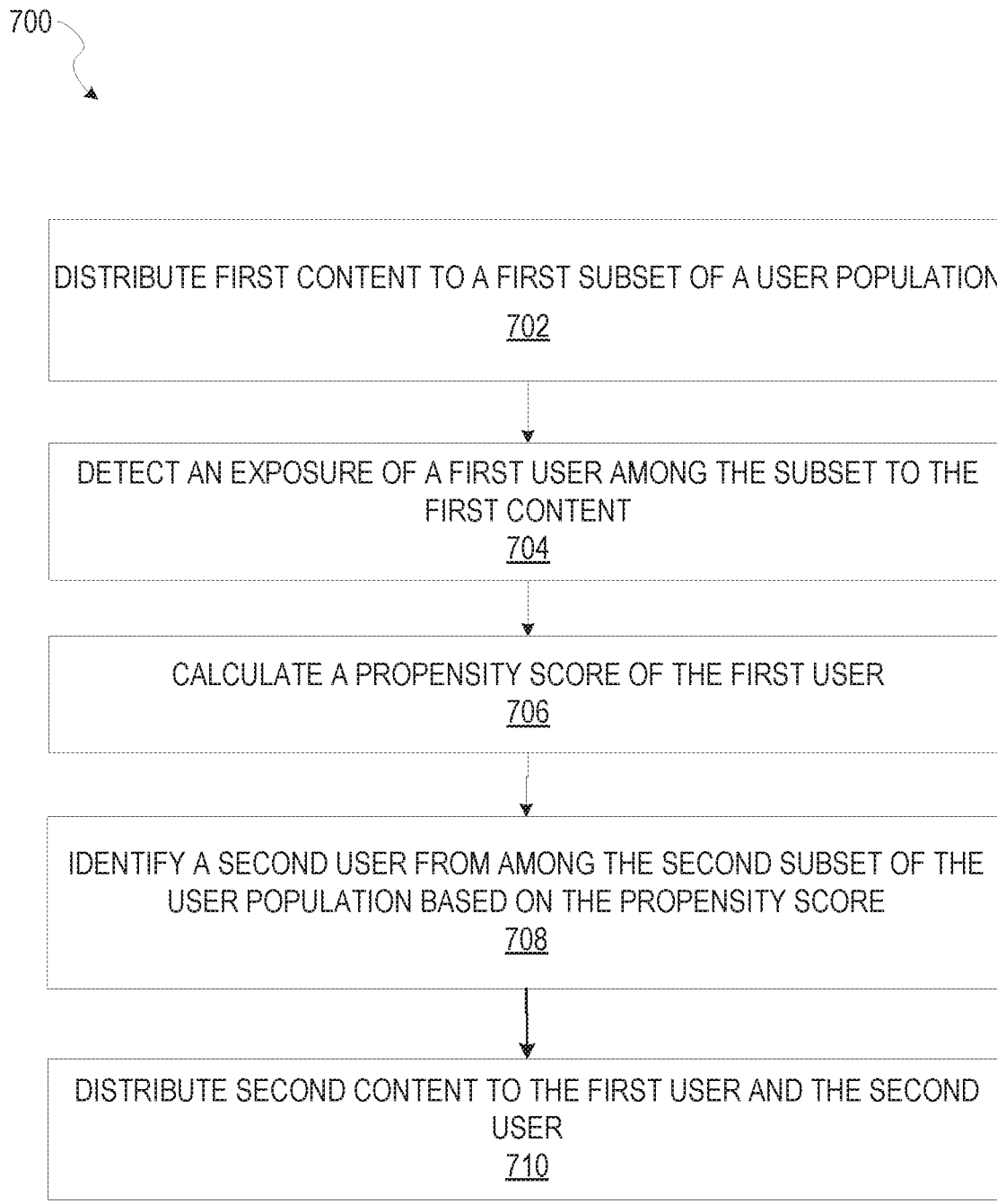
FIG. 7 is a flowchart illustrating various operations of a survey distribution system in performing a method for distributing content, according to certain example embodiments.

FIG. 7 is a flowchart illustrating various operations of a survey distribution system 124 in performing a method 700 for distributing content, according to certain example embodiments. Operations of the method 700 may be performed by the modules described above with respect to FIG. 6. As shown in FIG. 7, the method 700 includes one or more operations 702, 704, 706, 708, and 710.

At operation 702, the distribution module 602 distributes first content to a first subset of a user population. For example, an administrator of the survey distribution system 124 may provide user inputs identifying the first subset of the user population. The user inputs may specify one or more requisite user attributes of users to receive the first content. The user attributes may include demographics details (e.g., age, gender, height), user profile data (e.g., user groups, location, user connections), as well as user activity data (e.g., clicks, likes, views, time spent using an application).

For example, the administrator may indicate that the first content is distributed to all users among the population of users that are: male, ages 20-30, are connected with a specified user account (e.g., celebrity account), and which interacted with the application server 112 within a specified period of time.

In some example embodiments, the administrator of the survey distribution system 124 may provide a number of users to distribute the first content. In further embodiments, the administrator may indicate a number of users to be exposed to the first content. For example, the distribution module 602 may distribute the first content to users among the population of users until a specified number of users have been exposed to the first content.

In some example embodiments, distributing the first content to the first subset of the user population includes causing display of a notification that includes a description or indication of the first content. A recipient of the notification (e.g., a user from among the first subset), may cause display of the first content by providing a user input to the notification. In response to receiving such an input, the distribution module 602 may cause a client device 102 to cause display of the first content, wherein the first content may include media items such as images, videos, as well as interactive filter elements.

At operation 704, the exposure detection module 604 detects exposures of client devices from among the first subset to the first content. An exposure of a user to the first content includes causing display of the first content at an associated client device of the user (e.g., client device 102), such that an "exposure" indicates that the user has seen or displayed the first content. For example, the exposure detection module 604 may receive an indication that a first user from among the first subset of the use population has provided a user input to cause display of the first content at an associated client device 102.

At operation 706, the scoring module 608 calculates a propensity score of users from among the first subset of users that were exposed to the first content. For example, in response to receiving an indication that a first user was exposed to the first content, the scoring module 606 may retrieve user attributes of the user to calculate a propensity score. The user attributes gathered by the scoring module 608 may include demographics information, such as a user's age and gender, as well as user activity data, such as data indicating the amount of time the user engages with an application or the first content, a number of messages which the user sends to connections of the user, and a frequency in which the user engages with the application or the first content. For example, the scoring module 608 may retrieve data which indicates that the user forwarded the first content to five users from among a connection list, and that the user viewed or interacted with the first content for five minutes. In some example embodiments, the scoring module 608 calculates an average propensity score of the users exposed to the first content.

At operation 708, the identification module 606 identifies a second subset of users that have not been exposed to the first content, from among the population of users, based on the propensity score or average propensity score. The second subset of users may therefore function as a "control" group, in that they are similar to the first subset of users, but have not been exposed to the first content.

In some example embodiments, the identification module 606 may identify a number of users for the second subset of the population of users, based on a number of users among the first subset. For example, the identification module 606 may determine a number of users among the first subset of users, and identify the same number of users for the second subset.

At operation 710, the distribution module 602 distributes second content (e.g., a survey) to the first subset of users and the second subset of users, wherein the first subset of users comprises users exposed to the first content, and the second subset of users comprises users that have not been exposed to the first content. In some example embodiments, the distribution module 602 may cause display of a notification at client devices among the first subset and the second subset, such that the notification includes interactive interface elements configured to receive user inputs. For example, a user may provide an input to the notification to cause display of the second content (e.g., the survey), or to ignore the second content.

The second content may include a survey associated with the first content. For example, the survey may comprise one or more question related to the first content, and requesting a response. In some example embodiments, the request may include a request for a binary response (e.g., yes/no, good/bad, etc.).

Figure 8:
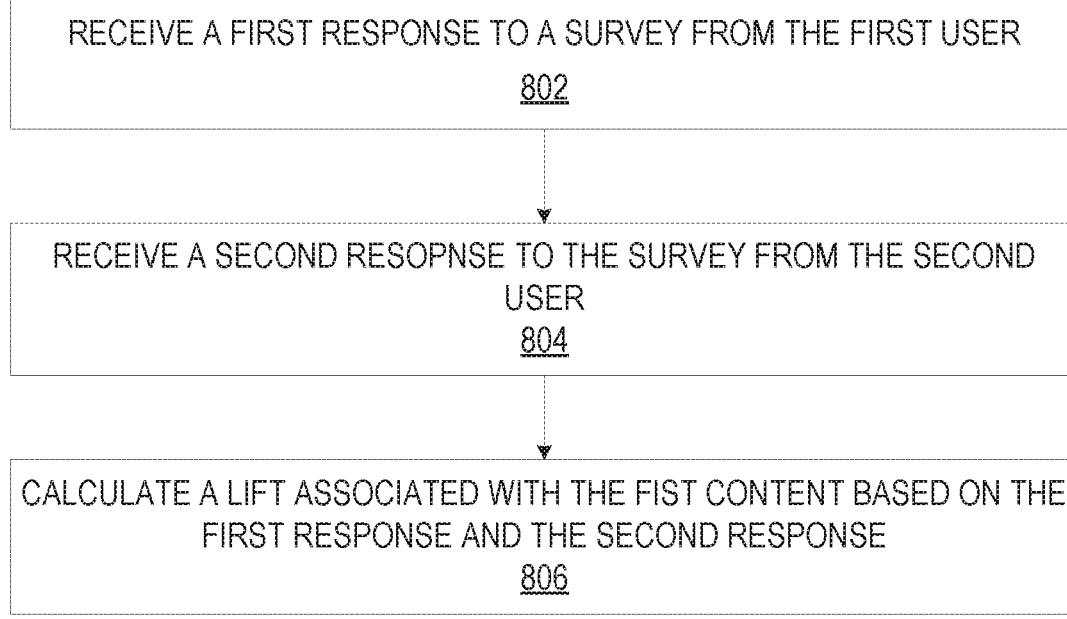
FIG. 8 is a flowchart illustrating various operations of a survey distribution system in performing a method for calculating a lift associated with content, according to certain example embodiments.

FIG. 8 is a flowchart illustrating various operations of a survey distribution system in performing a method 800 for calculating a lift associated with content, according to certain example embodiments. Operations of the method 800 may be performed by the modules described above with respect to FIG. 6. As shown in FIG. 8, the method 800 includes one or more operations 802, 804, and 806. In some embodiments, the method 800 may be performed as a sub-routine, or subsequent to, the method 700 of FIG. 7.

At operations 802 and 804, the survey distribution system 124 receives responses to the survey from the first subset of users and the second subset of users, wherein the first subset comprises users exposed to the first content, and the second subset comprises users that have not been exposed to the first content. The responses may for example include binary responses, such as a "yes," or a "no," or a "positive," or "negative."

At operation 806, the scoring module 608 calculates a lift associated with the first content based on the responses of the first and second subsets. For example, the responses may indicate that users exposed to the first content responded favorably to the survey, while users not exposed to the first content responded unfavorably. In some example embodiments the lift may be expressed as a percentage or statistic.

Figure 9:
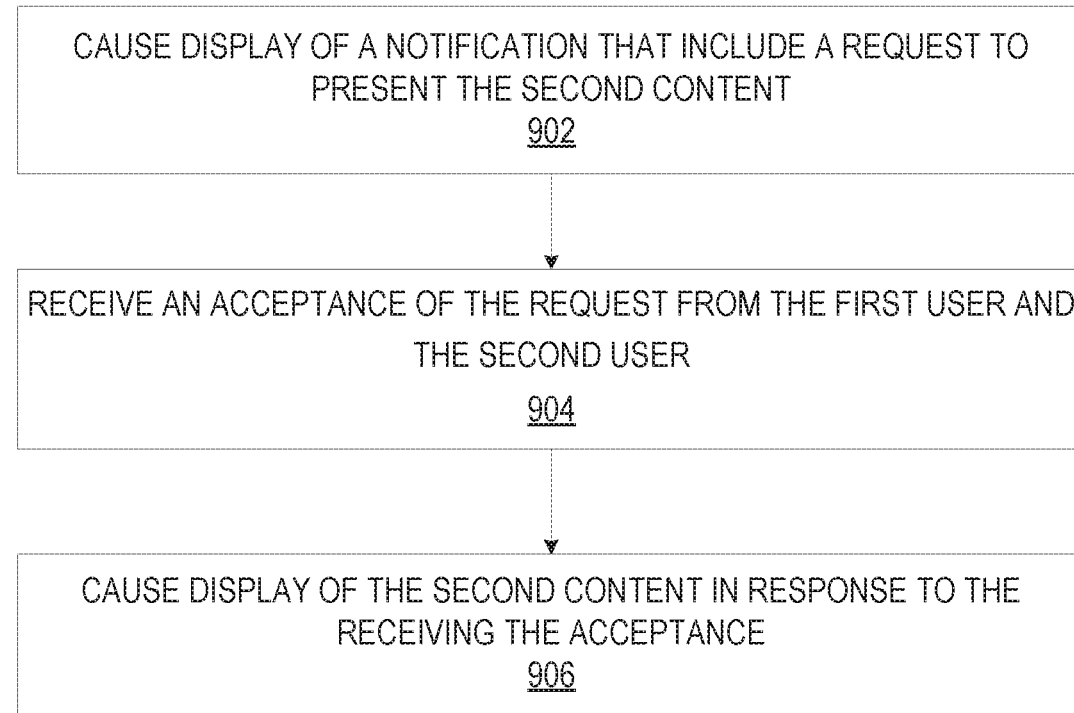
FIG. 9 is a flowchart illustrating various operations of a survey distribution system in performing a method for distributing content, according to certain example embodiments.

FIG. 9 is a flowchart illustrating various operations of a survey distribution system in performing a method 900 for distributing content, according to certain example embodiments. Operations of the method 900 may be performed by the modules described above with respect to FIG. 6. As shown in FIG. 9, the method 900 includes one or more operations 902, 904, and 906. In some embodiments, the method 900 may be performed as a sub-routine, or subsequent to, the method 700 of FIG. 7.

At operation 902, the distribution module 602 causes display of a notification at a client device 102, wherein the notification includes a request to present the second content. As discussed above with respect to FIGS. 7 and 8, the second content may include a survey comprising one or more questions requesting binary responses. The notification may be displayed as an overlay upon a graphical user interface of the client device 102, such that the notification may be moved or repositioned within the graphical user interface. In some embodiments, the notification may include an indication of the second content (e.g., "Take this quick survey!"). Recipients of the notification may provide a user input to ignore or accept the notification.

In response to receiving a user input to the notification, the distribution module 602 may cause display of the second content (e.g., the survey). For example, the survey may be overlaid over graphical elements within a graphical user interface of the client device 102. The survey may comprise a set of questions related to the first content, wherein the questions include requests for responses. In some example embodiments, the requests may include requests for binary responses.

Software Architecture

Figure 10:
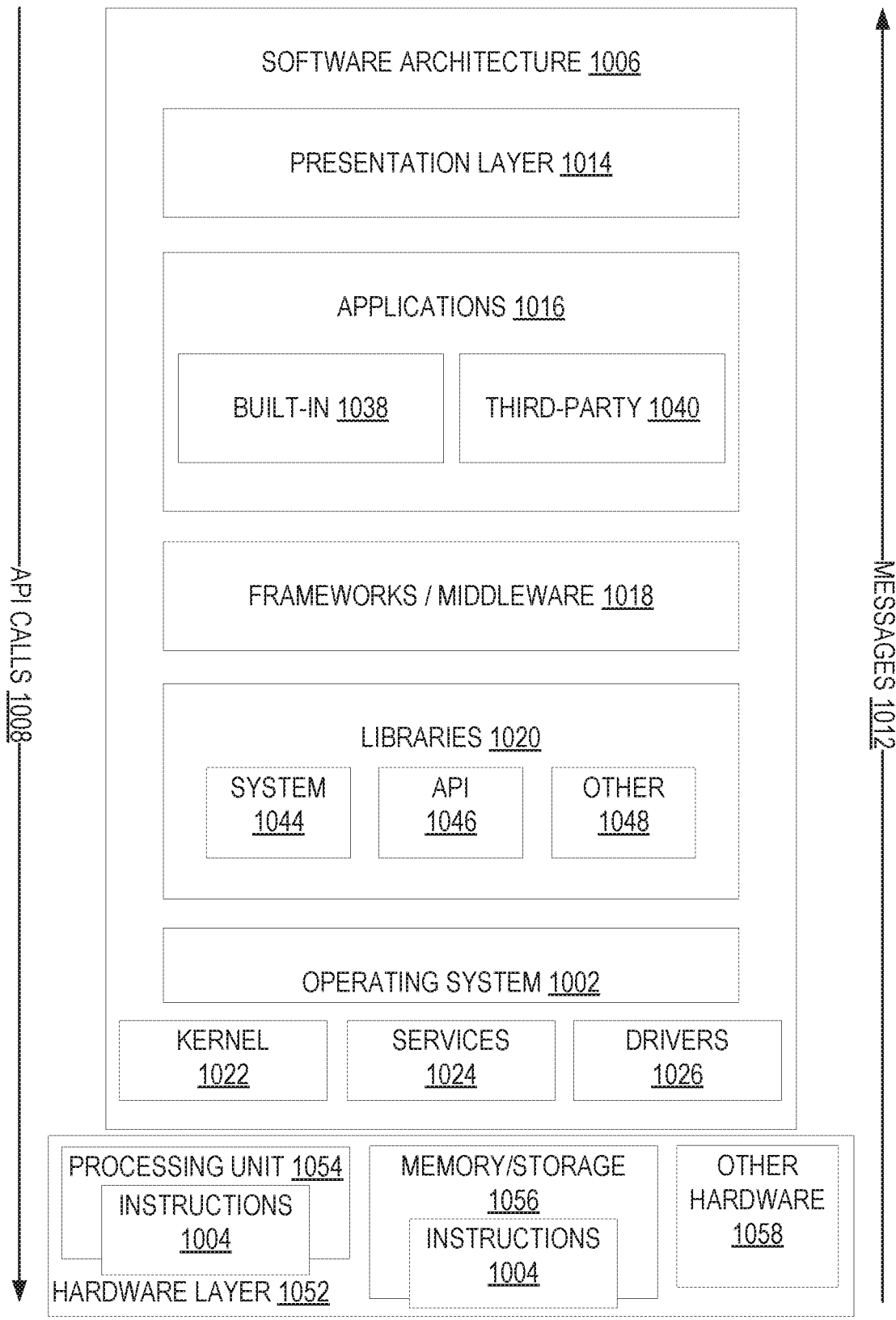
FIG. 10 is a block diagram illustrating a representative software architecture, which may be used in conjunction with various hardware architectures herein described and used to implement various embodiments.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 700 of FIG. 11 that includes, among other things, processors 1104, memory 1114, and I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016 and a presentation layer 1014. Operationally, the applications 1016 and/or other components within the layers may invoke application programming interface (API) API calls 1008 through the software stack and receive a response as in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

Figure 11:
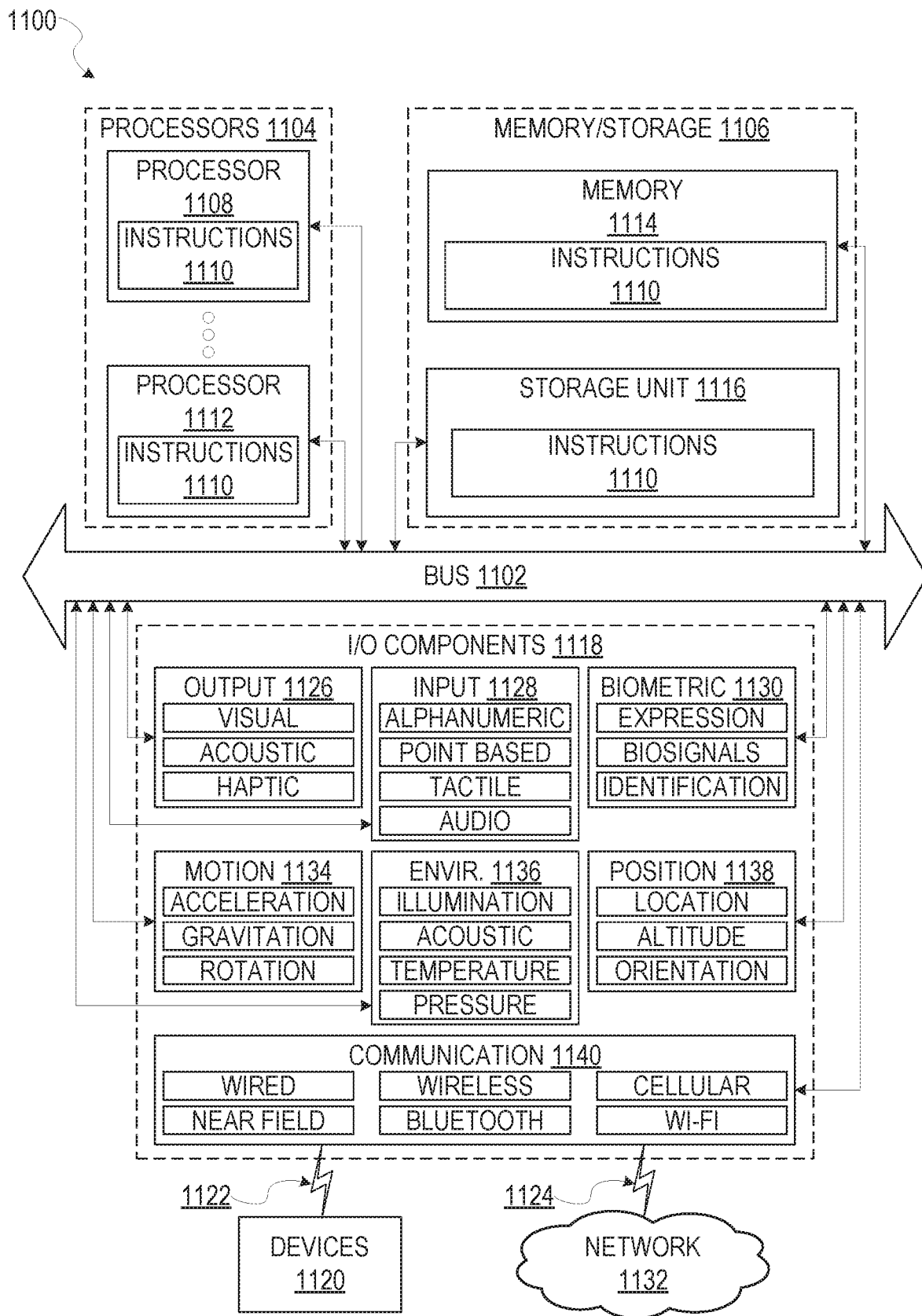
FIG. 11 is a block diagram illustrating components of a machine, according to some example embodiments, able to read instructions from a machine-readable medium (e.g., a machine-readable storage medium) and perform any one or more of the methodologies discussed herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/component "logic" can be separated from the aspects of the application/component that interact with a user. FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components. Near Field Communication (NFC) components, Bluetooth® components (e.g., Bluetooth® Low Energy). Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code. Data Matrix, Dataglyph, MaxiCode. PDF417, Ultra Code. UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands". "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

What is claimed is:

1. A system to calculate a lift associated with content, the system comprising:
   a memory; and
   at least one hardware processor coupled to the memory and comprising instructions that causes the system to perform operations comprising:
      causing display of a graphical user interface on a user device, the graphical user interface providing an interactive map image;
      receiving a user selection of a geographic location displayed within the interactive map image at the user device;
      receiving, from a hardware processor, a distribution request that comprises hg selection of the geographic location displayed within the interactive map image, and an identification of user activity data, wherein the user activity data includes one or more user actions performed within a predefined time period;
      receiving location data from a plurality of client devices;
      detecting, from a hardware processor, Ii plurality of client devices within a geo-fence that encompasses a location that corresponds with the geographic location based on the location data received from the plurality of client devices;
      identifying a first subset of client devices among the plurality of client devices based on the one or more user actions performed at the first subset of the client devices within the predefined period of time;
      causing a display of first content at the first subset of the client devices, the display comprising a display duration that indicates a period of time in which the first content was presented within a graphical user interface of the first subset of the client devices;
      determining, by a hardware processor, that the display duration that corresponds with the first subset of the client devices transgresses a threshold value;
      accessing a user attribute associated with the first subset of the client devices responsive to the display duration of the first content transgressing the threshold value, the user attribute including an amount of time that users of the first subset of the client device engage with the first content and a number of messages which the users send to connections of the users;
      generating, by a hardware processor, a propensity score of the first subset of the client devices based on the user attribute associated with the first subset of the client devices, the propensity score indicating a user's likelihood of being exposed to the first content;
      identifying a second subset of the plurality of client devices based on one or more of the user attribute and the propensity score associated with the first subset of the client devices;
      causing display of a notification that includes a request to present second content to the second subset of the client devices;
      tracking, by an engagement tracking system of an application server and via messaging client applications installed on the client devices, a number of users from among the second subset of client devices that respond to the second content;
      comparing the number of users from among the second subset of client devices that respond to the second content with a threshold;
      in response to a comparison result that the number of users from among the second subset of client devices that respond to the second content is less than the threshold,
         adding at least one client device to the second subset of the client devices based on the propensity score and the one or more of the user attribute; and
         causing display of the notification that includes the request to present the second content to the added at least one client device;
      receiving, at the system and from a client device from among the second subset of client devices, a selection of the request from within the notification presented at the client device from among the second subset of the client devices;
      causing display of a presentation of the second content within a graphical user interface of the client device responsive to the selection of the request, the second content comprising a plurality of graphical icons that correspond with a plurality of selectable options;
receiving, at the system and from at least the client device from among the second subset of client devices, a result of the survey, the result comprising selections of options from among the plurality of selectable options; and
generating, for display at a client device, a visualization chart of the result of the survey.

2. The system of claim 1, wherein the second content includes a survey associated with the first content, and the instructions cause the system to perform operations further comprising:
receiving a first response to the survey from a first user among the first subset;
receiving a second response to the survey from a second user from the portion of the second subset; and
calculating the lift associated with the first content based on the first response and the second response.

3. The system of claim 2, wherein the survey includes a request for a binary response.

4. The system of claim 1, wherein the distributing the first content to the first subset of the user population includes:
receiving targeting parameters, wherein the targeting parameters include a period of time to distribute the first content, location criteria, and demographics criteria.

5. The system of claim 1, wherein the identifying the portion of the second subset based on the one or more user attribute and the propensity score of the first subset includes:
identifying the user attribute among the first subset of the user population; and
identifying the user attribute among the portion of the second subset of the user population.

6. The system of claim 1, wherein the distributing the notification that includes the request to display the second content to the first subset and the portion of the second receiving an acceptance of the request; and
causing display of the second content in response to the receiving the acceptance.

7. The system of claim 6, wherein the receiving the acceptance of the request includes:
receiving a selection of the notification.

8. The system of claim 6, wherein the causing display of the second content includes:
overlaying a presentation of the second content upon a graphical user interface.

9. A method for calculating a lift associated with content, the method comprising:
causing display of a graphical user interface on a user device, the graphical user interface providing an interactive map image;
receiving a user selection of a geographic location displayed within the interactive map image at the user device;
receiving, from a hardware processor, a distribution request that comprises the selection of the geographic location displayed within the interactive map image, and an identification of user activity data, wherein the user activity data includes one or more user actions performed within a predefined time period;
receiving location data from a plurality of client devices;
detecting, from a hardware processor, the plurality of client devices within a geo-fence that encompasses a location that corresponds with the geographic location based on the location data received from the plurality of client devices;
identifying a first subset of client devices among the plurality of client devices based on the one or more user actions performed at the first subset of the client devices within the predefined period of time;
causing a display of first content at the first subset of the client devices, the display comprising a display duration that indicates a period of time in which the first content was presented within a graphical user interface of the first subset of the client devices;
determining, by a hardware processor, that the display duration that corresponds with the first subset of the client devices transgresses a threshold value;
accessing a user attribute associated with the first subset of the client devices responsive to the display duration of the first content transgressing the threshold value, the user attribute including an amount of time that users of the first subset of the client device engage with the first content and a number of messages which the users send to connections of the users;
generating, by a hardware processor, a propensity score of the first subset of the client devices based on the user attribute associated with the first subset of the client devices, the propensity score indicating a user's likelihood of being exposed to the first content;
identifying a second subset of the plurality of client devices based on one or more of the user attribute and the propensity score associated with the first subset of the client devices;
causing display of a notification that includes a request to present second content to the second subset of the client devices;
tracking, by an engagement tracking system of an application server and via messaging client applications installed on the client devices, a number of users from among the second subset of client devices that respond to the second content;
comparing the number of users from among the second subset of client devices that respond to the second content with a threshold;
in response to a comparison result that the number of users from among the second subset of client devices that respond to the second content is less than the threshold,
adding at least one client device to the second subset of the client devices based on the propensity score and the one or more of the user attribute; and
causing display of the notification that includes the request to present the second content to the added at least one client device;
receiving, at the system and from a client device from among the second subset of client devices, a selection of the request from within the notification presented at the client device from among the second subset of the client devices; and
causing display of a presentation of the second content within a graphical user interface of the client device responsive to the selection of the request, the second content comprising a plurality of graphical icons that correspond with a plurality of selectable options;
receiving, at the system and from at least the client device from among the second subset of client devices, a result of the survey, the result comprising selections of options from among the plurality of selectable options; and
generating, for display at a client device, a visualization chart of the result of the survey.

10. The method of claim 9, wherein the second content includes a survey associated with the first content, and the method further comprising:
receiving a first response to the survey from a first user among the first subset;
receiving a second response to the survey from a second user from the portion of the second subset; and
calculating the lift associated with the first content based on the first response and the second response.

11. The method of claim 9, wherein the survey includes a request for a binary response.

12. The method of claim 9, wherein the distributing the first content to the first subset of the user population includes:
receiving a targeting parameters, wherein the targeting parameters include a period of time to distribute the first content, location criteria, and demographics criteria.

13. The method of claim 9, wherein the identifying the portion of the second subset based on the one or more user attribute and the propensity score of the first subset includes:
identifying the user attribute among the first subset of the user population; and
identifying the user attribute among the portion of the second subset of the user population.

14. The method of claim 9, wherein the distributing the notification that includes the request to display the second content to the first subset and the portion of the second subset of the user population includes:
receiving an acceptance of the request; and
causing display of the second content in response to the receiving the acceptance.

15. A non-transitory machine-readable storage medium for calculating a lift associated with content, the non-transitory machine-readable storage medium comprising instructions that, when executed by one or more processors of a machine, cause the machine to perform operations comprising:
causing display of a graphical user interface on a user device, the graphical user interface providing an interactive map image;
receiving a user selection of a geographic location displayed within the interactive map image at the user device;
receiving, from a hardware processor from among the one or more processors, a distribution request that comprises the selection of the geographic location displayed within the interactive map image, and an identification of user activity data, wherein the user activity data includes one or more user actions performed within a predefined time period;
receiving location data from a plurality of client devices;
detecting, from a hardware processor, the plurality of client devices within a geo-fence that encompasses a location that corresponds with the geographic location based on tag location data received from the plurality of client devices;
identifying a first subset of client devices among the plurality of client devices based on the one or more user actions performed at the first subset of the client devices within the predefined period of time;
causing a display of first content at the first subset of the client devices, the display comprising a display duration that indicates a period of time in which the first content was presented within a graphical user interface of the first subset of the client devices;
determining, by a hardware processor, that the display duration that corresponds with the first subset of the client devices transgresses a threshold value;
accessing a user attribute associated with the first subset of the client devices responsive to the display duration of the first content transgressing the threshold value, the user attribute including an amount of time that users of the first subset of the client device engage with the first content and a number of messages which the users send to connections of the users;
generating, by a hardware processor, a propensity score of the first subset of the client devices based on the user attribute associated with the first subset of the client devices, the propensity score indicating a user's likelihood of being exposed to the first content;
identifying a second subset of the plurality of client devices based on one or more of the user attribute and the propensity score associated with the first subset of the client devices;
causing display of a notification that includes a request to present second content to the second subset of the client devices;
tracking, by an engagement tracking system of an application server and via messaging client applications installed on the client devices, a number of users from among the second subset of client devices that respond to the second content;
comparing the number of users from among the second subset of client devices that respond to the second content with a threshold;
in response to a comparison result that the number of users from among the second subset of client devices that respond to the second content is less than the threshold,
adding at least one client device to the second subset of the client devices based on the propensity score and the one or more of the user attribute; and
causing display of the notification that includes the request to present the second content to the added at least one client device;
receiving, at the non-transitory machine-readable storage medium and from a client device from among the second subset of client devices, a selection of the request from within the notification presented at the client device from among the second subset of the client devices; and
causing display of a presentation of the second content within a graphical user interface of the client device responsive to the selection of the request, the second content comprising a plurality of graphical icons that correspond with a plurality of selectable options;
receiving, at the system and from at least the client device from among the second subset of client devices, a result of the survey, the result comprising selections of options from among the plurality of selectable options; and
generating, for display at a client device, a visualization chart of the result of the survey.

16. The non-transitory machine-readable storage medium of claim 15, wherein the second content includes a survey associated with the first content, and the instructions cause the machine to perform operations further comprising:
receiving a first response to the survey from a first user among the first subset;
receiving a second response to the survey from a second user from the portion of the second subset; and calculating the lift associated with the first content based on the first response and the second response.

17. The non-transitory machine-readable storage medium of claim 15, wherein the survey includes a request for a binary response.

* * * * *